United States Patent [19]

Funayama et al.

[11] Patent Number: 5,172,544
[45] Date of Patent: Dec. 22, 1992

[54] METHOD FOR POWER GENERATION WITH GAS TURBINE USING GASIFIED FUEL OF INFERIOR QUALITY

[75] Inventors: Yasuo Funayama, Tokyo; Jun Izumi, Nagasaki; Shozo Kaneko, Nagasaki; Kazuaki Oshima, Nagasaki all of Japan

[73] Assignees: The Tokyo Electric Power Company, Inc.; Mitsubishi Jukogyo Kabushiki Kaisha, both of Tokyo, Japan

[21] Appl. No.: 639,066

[22] Filed: Jan. 9, 1991

[30] Foreign Application Priority Data

Jan. 12, 1990 [JP] Japan ................. 2-3492

[51] Int. Cl.$^5$ ................. F02C 3/28
[52] U.S. Cl. ................. 60/39.02; 60/39.12
[58] Field of Search ................. 60/39.02, 39.12; 55/75, 55/389

[56] References Cited

U.S. PATENT DOCUMENTS

| | | |
|---|---|---|
| 3,164,454 | 1/1965 | Wilson ................. 55/75 |
| 3,313,091 | 4/1967 | Berlin . |
| 3,923,477 | 12/1975 | Armond et al. . |
| 4,015,956 | 4/1977 | Munzner et al. . |
| 4,019,314 | 4/1977 | Springmann ................. 60/39.02 |
| 4,089,938 | 5/1978 | Turner . |
| 4,256,469 | 3/1981 | Leitgeb . |
| 4,785,621 | 11/1988 | Alderson et al. . |
| 4,810,265 | 3/1989 | Lagree et al. ................. 55/75 |

FOREIGN PATENT DOCUMENTS 3241169  7/1983  Fed. Rep. of Germany .

Primary Examiner—Louis J. Casaregola
Attorney, Agent, or Firm—Wenderoth, Lind & Ponack

[57] ABSTRACT

Power generation with a gas turbine using a gasified fuel of inferior quality is accomplished with high efficiency by a method which comprises bleeding part of highly compressed air emanating from an air compressor driven by a gas turbine and introducing the part of highly compressed air into an oxygen adsorbing tower containing an oxygen adsorbent thereby causing the oxygen from the highly compressed air to be adsorbed by the oxygen adsorbent and, at the same time, allowing the nitrogen gas from the highly compressed air to flow in a highly compressed state through the oxygen adsorbing tower, desorbing the adsorbed oxygen from the oxygen adsorbent under a vacuum, compressing the oxygen gas resulting from the desorption and gasifying a fuel of inferior quality with the compressed oxygen gas as an oxidizing agent, effecting combustion of the gasified fuel of inferior quality with the remainder of the compressed air produced by air compressor, mixing the gas arising from the combustion with the highly compressed nitrogen gas having flowed through the adsorbing tower, and introducing the resultant mixture into the gas turbine thereby driving the gas turbine and inducing power generation.

2 Claims, 2 Drawing Sheets

METHOD FOR POWER GENERATION WITH GAS TURBINE USING GASIFIED FUEL OF INFERIOR QUALITY

BACKGROUND OF THE INVENTION

1. Field of the Invention

This invention relates to a method for generating power with a gas turbine using the gas resulting from gasification of a fuel of inferior quality such as coal, tar, or less volatile oil by the use of a pressure swing method for the production of oxygen.

2. Description of the Prior Art

The coal gasification composite power generation system can be expected to offer highly efficient and clean, power generation because it utilizes the gas turbine which is the most efficient of all the heat engines using fossil fuels and because it uses as the fuel for the gas turbine the gasified fuel which has been produced by a gasifying furnace and scrubbed to expel dust and desulfurized. For the gasification of such fuels of inferior quality as coal, tar, and less volatile oil, methods using air and methods which use oxygen respectively as an oxidizing agent have been proposed.

The use of air in this gasification is disadvantageous from the standpoint of motive power because the gasifying furnace for the gasification of such a fuel of inferior quality is operated under a pressure higher than the pressure of the gas turbine and, as a result, the nitrogen which accompanies oxygen in the air is inevitably destined to increase in pressure. Further, since the gasified fuel obtained by this gasification falls short of 1,000 Kcal/Nm$^3$ in calorific value, the combustion of this gasified fuel calls for skill. Further, since the gasifying furnace itself and the cleanup system for removal of dust and desulfurization depend largely on the amount of a gas to be treated, the method which uses air entrained by the nitrogen originating in the air incurs an unduly large cost of equipment.

For the reason given above, the methods using oxygen muster expectations. In reality, however, the method of deep cooling separation which is widely used for the production of oxygen in a large volume has not overcome the drawback inherent in the use of air because it entails a heavy power consumption for the production of oxygen and incurs a high cost of equipment. Moreover, the deep cooling method encounters unusual difficulties in coping with the practices of load change, weekend interruption, and daily interruption which have found acceptance in the power generation systems in recent years.

FIG. 2 is a schematic diagram of an oxygen blowing coal gasifying composite power generation system possessing such merits and demerits as described above. The air which has been compressed to a pressure of about 6 atm by an air compressor 01 is separated in a total low-pressure type deep cooling separation and production device 02 into oxygen gas 03 of a pressure in the range of 1 to 1.2 atms and nitrogen gas 04 of a pressure in the range of 1 to 1.2 atms. The oxygen obtained in the total low-pressure type deep cooling separation and production device 02 has a very high concentration falling in the range of 90 to 99.6 vol %. The power during the production of oxygen is approximately 0.36 kwh/Nm$^3$—O$_2$ in the case of an oxygen purity of 90 vol % and 0.4 kwh/$^3$—O$_2$ in the case of an oxygen purity of 99.6 vol %.

The power generation system does not require the oxygen to be in a very high concentration and, therefore, effects gasification of coal by producing oxygen gas in a purity of 90 vol %, compressing the oxygen gas to a pressure of 30 atms. by an oxygen compressing device 05, mixing the compressed oxygen gas with steam 06, and supplying the resultant mixture as accompanied by coal 08 to a coal gasifying furnace 07. The resultant gasified coal having an average calorific value of 5,000 Kcal/Nm$^3$ is scrubbed to expel dust by a high-temperature dust removing device 09, is desulfurized by a dry type desulfurizing device 010 to be cleaned enough to be used in the gas turbine cycle, and then is supplied via a flow path 011 to a combustion device 012.

In the meantime, the greater part of the air which has been compressed by a compressor 013 is fed to the combustion device 012, consumed therein for effecting combustion of the aforementioned gasified coal in a compressed state, and is introduced in the form of a hot compressed fluid via a flow path 015 into an inflation type gas turbine 016. On the existing technical level, the highest allowable working temperature of the material of the gas turbine is about 1,380° C. Since the temperature of combustion in the combustion device 012 exceeds this temperature, part of the aforementioned compressed air is supplied via a flow path 017 to the flow path 015 and used for cooling the combustion device 012.

The compressor 013 and the gas turbine 016 are connected with a common shaft 018 to a power generator 019 so that the rotation of the gas turbine 016 produces electric power. Since the exhaust gas which emanates at a lower temperature under a lower pressure from the gas turbine 016 after performing its work therein has a temperature of about 500° C., it is treated in a waste heat recovery boiler and steam turbine system 020 for collection of electric energy.

The power generation system which uses oxygen in place of air as an oxidizing agent in the gasification of such a fuel of inferior quality as coal as described above operates by the use of a relatively small amount of oxygen separated from nitrogen and, therefore, enjoys many prominent advantages such as:

(1) Generous reduction in the power required for increasing the pressure of the oxidizing agent in the gasifying furnace and economization of the cost of the pressure increasing device.

(2) Reduction in the cost of equipment due to a decrease in the cross-sectional area of the coal gasifying furnace.

(3) Reduction in the equipment cost and variable cost of the dust removing device and the desulfurizing device, which both depend largely on the amount of gas subjected to the treatment, due to a decrease in the volume of the gasified coal.

(4) Improvement of the operating capacity of the combustion device due to an increase in the calorific value of the gasified coal.

(5) Simultaneity of process between the power generation and the gasification for production of chemical -raw material.

The fact that the equipment cost and the variable cost for the method of deep cooling separation, which is widely employed as means for the production of oxygen in a large volume, are such as to offset substantially the aforementioned advantages derived from using oxygen as the oxidizing agent for gasification. And the fact that such operations as load change, weekend interruption, and daily interruption, which and indispensable requirements for the power generation system, are extremely difficult to effect are causes for reluctance shown in the adoption of this method.

SUMMARY OF THE INVENTION

This invention, conceived in order to eliminate the drawbacks of the prior art described above, provides a method for power generation with a gas turbine, which method comprise gasifying a fuel of inferior quality with the aid of the pressure swing method for the production of oxygen and using the resultant gasified fuel for the operation of the gas turbine.

To be specific, this invention is directed to a method for power generation with a gas turbine using a gasified fuel of inferior quality, which method is characterized by bleeding part of highly compressed air emanating from an air compressor driven by a gas turbine and introducing said part of highly compressed air into an oxygen adsorbing tower containing an oxygen adsorbent thereby causing the oxygen from the highly compressed air to be adsorbed by the oxygen adsorbent and, at the same time, allowing the nitrogen gas from the highly compressed air to flow in a highly compressed state through the oxygen absorbing tower, adsorbing the adsorbed oxygen from the oxygen adsorbent under a vacuum, compressing the oxygen gas resulting from the desorption and gasifying a fuel of inferior quality with the compressed oxygen gas as an oxidizing agent, effecting combustion of the gasified fuel of inferior quality with the remainder of the compressed air produced by the air compressor, mixing the gas arising from the combustion with the highly compressed nitrogen gas having flowed through the adsorbing tower, and introducing the resultant mixture into the gas turbine thereby driving the gas turbine and inducing power generation.

DETAILED DESCRIPTION OF THE PREFERRED EMBODIMENT

In this invention, part of the highly compressed air produced by an air compressor which is driven by a gas turbine is bled and introduced into an oxygen adsorbing tower, wherein the oxygen in the air is adsorbed by an oxygen adsorbent and the remaining nitrogen gas is allowed to flow therethrough in a highly compressed state. Since the adsorption of oxygen in this oxygen adsorption tower is effected under a highly compressed state, it proceeds with a high efficiency of about 20% of the oxygen by volume being adsorbed, based on the amount of air. Thus, the use of the oxygen adsorbent in a small amount suffices to effect the adsorption and the use of the oxygen adsorption tower of a proportionately small capacity suffices for the purpose of effecting the adsorption.

The oxygen adsorbed by the oxygen adsorbent is desorbed in the form of oxygen gas under a vacuum. This oxygen gas is compressed and then used as an oxidizing agent for the gasification of coal or other fuel of inferior quality. The gasified fuel which issues from the gasification of the fuel of inferior quality assumes a volume exclusive of the volume which would be occupied by the nitrogen gas when air was used as an oxidizing agent in the gasification, with the result that the calorific value of the gasified fuel is proportionately high and the volume of the gasifying device such as the gasifying furnace is accordingly small.

The gasified fuel is burnt and converted into a hot highly compressed combustion gas by the remainder of the highly compressed air produced by the aforementioned air compressor. This combustion gas is mixed with the highly compressed nitrogen gas which has flowed through the oxygen adsorption tower. The resultant mixture is introduced into the gas turbine and used therein for driving the gas turbine and consequently inducing power generation.

The mixed fluid of the combustion gas with the nitrogen gas which is introduced into the gas turbine has a temperature lower than the highest allowable working temperature of the material of the gas turbine owing to the incorporation therein of the nitrogen gas. This mixed fluid further allows the potential energy of the highly compressed nitrogen gas and the potential energy of the combustion gas to be jointly converted into a motive force by the gas turbine.

Figure 1:
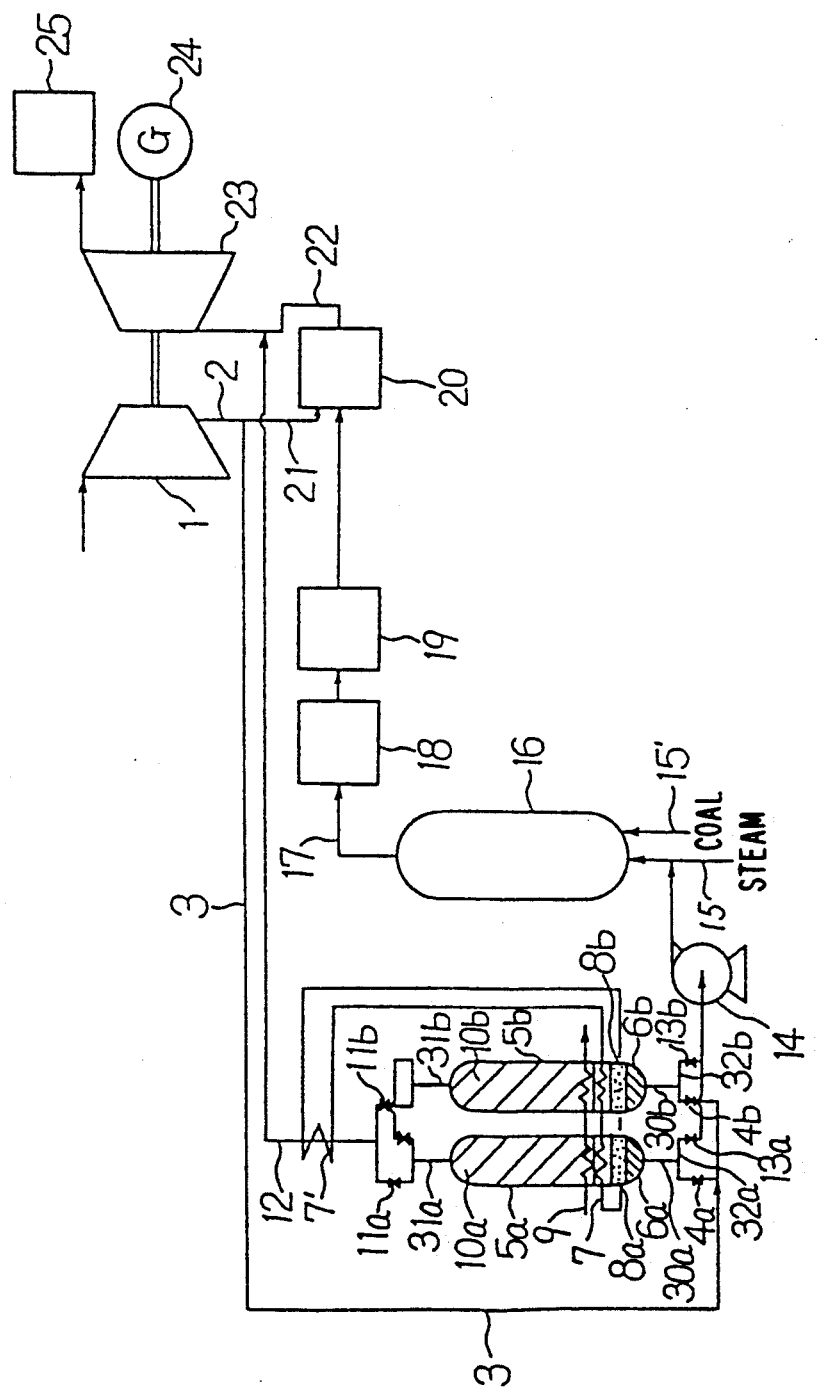
FIG. 1 is a schematic diagram of one embodiment of a power generation system according to the present invention.
Figure 2:
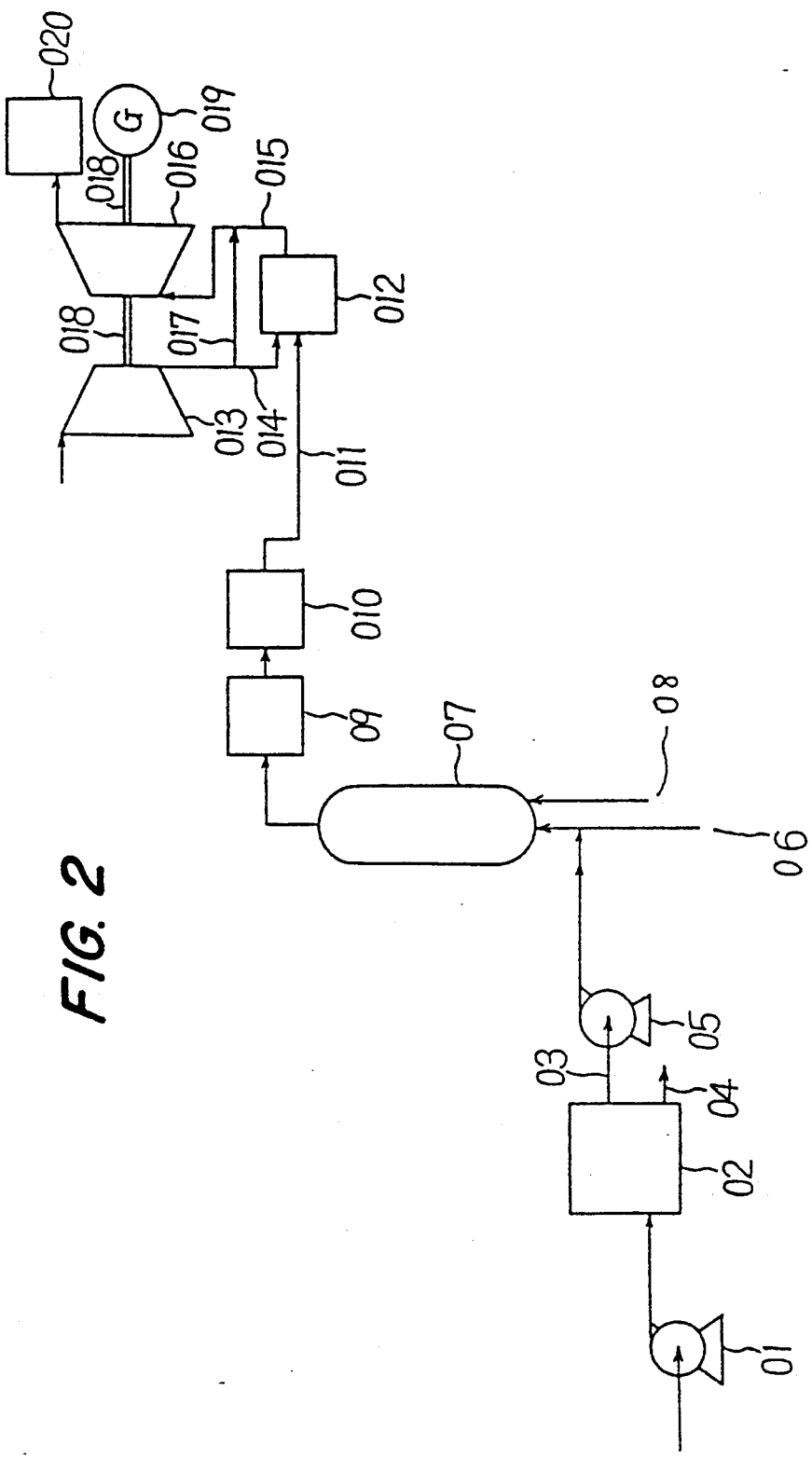
FIG. 2 is a schematic diagram of a conventional coal gasification composite power generation plant using oxygen.

Now, this invention will be described more specifically below with reference to FIG. 1.

An air compressor 1, an inflation type gas turbine 23, and a generator 24 are connected to a common shaft. A flow path 2 originating from the outlet of the air compressor 1 is connected to the inlet side of a combustion device 20 adapted to supply the gas turbine 23 with the combustion gas. Oxygen adsorption towers 5a, 5b are disposed parallel. Flow paths 30a, 30b connected to the bottom parts of the adsorption towers 5a, 5b are connected, respectively, via valves 4a, 4b to a bleeding flow path 3 branched from the flow path 2 mentioned above. Dehumidifiers of activated alumina 6a, 6b, cold-accumulating agents 8a, 8b, an air heat-exchange device 7, a Freon heat-exchange device 9, and oxygen adsorbents of Na-A type zeolite 10a, 10b are sequentially disposed upwardly in the oxygen adsorption towers 5a, 5b in the order mentioned. To the top parts of the oxygen adsorption towers 5a, 5b are respectively connected flow paths 31a, 31b provided with valves 11a, 11b. The flow paths 31a, 31b are connected to a flow path 22 extending between the outlet side of the combustion device 20 and the gas turbine 23. The air heat-exchange device 7 mentioned above is connected to a heat-exchange device 7' which is disposed in a flow path 12.

Flow paths 32a, 32b provided, respectively, with valves 13a, 13b, branch from between the valves 4a, 4b of the aforementioned flow paths 30a, 30b of the oxygen adsorption towers 5a, 5b. The flow paths 32a, 32b are joined to each other and are connected to the inlet side of a compressor 14. The outlet side of the compressor 14 is joined to a steam supply path 15 connected to the bottom part of a gasifying furnace 16. The bottom part of the gasifying furnace 16 is connected to a coal supply path 15'. A flow path 17 which is also connected to the top part of the gasifying furnace 16 is connected to a dust removing device 18. The dust removing device 18 is connected to a desulfurizing device 19 and this desulfurizing device 19 is connected to the inlet side of the aforementioned combustion device 20. Reference numeral 25 denotes a recovery boiler steam turbine system to which the exhaust gas from the gas turbine 23 is supplied.

In the present embodiment, the air compressed to a pressure of about 15 atms in the air compressor 1 driven by the gas turbine 23 is partly bled through the flow path 2 into the flow path 3. When the valves 4a, 11a of the tower 5a, i.e. one of the parallel oxygen adsorption towers 5a, 5b, are opened, the valve 13a is closed and the valves 4b, 11b of the tower 5b are closed and, at the same time, the valve 13b is opened. Through the opened valve 4a, the compressed air enters the oxygen adsorption tower 5a. The compressed air is dehumidified with the dehumidifier 6a, cooled with the cold accumulating agent 8a and by the air heat-exchange device 7, further cooled to a temperature of about $-70°$ C. by the Freon heat-exchange device 9, and passed through the oxygen adsorbent 10a, with the result, that, the oxygen in the compressed air is adsorbed by the adsorbent 10a. In the meantime, the nitrogen is passed in a highly compressed state through the adsorption tower 5a. The nitrogen which has passed through the adsorption tower 5a possesses a pressure of 15–(0.1 to 0.5) atms., wherein the value 01 to 05 atm. represents the pressure loss suffered by the nitrogen during its flow through the adsorption tower 5a. This compressed nitrogen flows through the valve 11a and the heat-exchange device 7' to the flow path 12. Since the compressed air is supplied to the oxygen adsorption tower 5a and the oxygen in a highly compressed state is adsorbed the oxygen adsorbent 10a as described above, enhancement of the efficiency of adsorption, reduction in the amount of the oxygen adsorbent to be required, and an oxygen adsorption tower 5a requiring only a small capacity are all realized.

Through the flow path 30b and the flow path 32b incorporating the opened valve 13b, the other oxygen adsorption tower 5b is connected to the inlet side of the compressor 14 is and consequently caused to assume a vacuumized state. The oxygen which has been adsorbed in the oxygen adsorption tower 5b is desorbed in the form of oxygen gas from the adsorption tower 5b, introduced into the compressor 14, compressed thereby, and mixed with the steam from the steam supply path 15. The resultant mixed fluid and the coal from the coal supply path 15' are jointly supplied to the gasifying furnace 16.

After the adsorption of oxygen in the oxygen adsorption tower 5a and the desorption of oxygen in the oxygen adsorption tower 5b have been completed, the valves of the adsorption towers are switched and the compressed air is introduced into the oxygen adsorption tower 5b to induce the adsorption of oxygen and the desorption of the adsorbed oxygen from the oxygen adsorption tower 5a. The oxygen gas resulting from the desorption is introduced into the compressor 14. Thus, in the oxygen adsorption towers 5a, 5b, the adsorption and desorption of oxygen are continuously carried out by sequentially switching the adsorption of oxygen on one hand and the desorption of oxygen on the other hand in each adsorption tower. The adsorption and desorption in the oxygen adsorption towers 5a, 5b are generally each of a duration of about 75 seconds.

The oxygen which has been adsorbed by the oxygen adsorbents 10a, 10b in the oxygen adsorption towers 5a, 5b is desorbed in the form of oxygen gas from the oxygen adsorbents 10a, 10b upon exposure to a vacuum generated by the compressor 14. This desorption leaves the oxygen adsorbents in a regenerated state. The oxygen gas is passed through the cold accumulating agents 8a, 8b thereby gaining 70° C. so as to be elevated substantially to normal room temperature. It is then passed through the dehumidifiers 6a, 6b saturated in advance with water and the dehumidifiers are consequently dehumidified. This dehumidification leaves the dehumidifiers in a regenerated state.

The oxygen gas to be supplied to the gasifying furnace 16 is compressed to a pressure of about 30 atms by the compressor 14 en route to the gasifying furnace 16. While the deep cooling employed in the conventional method as already described requires oxygen to be compressed of the atmospheric pressure of about 30 atms, the method of the present embodiment allows the oxygen gas to be compressed by a compression ratio of 3, i.e. from the level of about 10 atms to about 30 atms when the desorption of the oxygen gas from the oxygen adsorbent is started. By the desorption of oxygen which proceeds over the subsequent period of about 75 seconds, the inner pressure of the adsorption towers is gradually decompressed eventually to the level of about 1 atm. In the final stage, the oxygen gas is compressed from 1 atm to 30 atms by the compressor 14. In the desorption of oxygen during the period of about 75 seconds, therefore, the inner pressure becomes substantially equal to the average increase of pressure from 4 atms to 30 atms. The method of the present embodiment, therefore, allows an economization of about 50% in power consumption as compared with the conventional deep cooling method.

In the gasifying furnace 16, the gasification of coal is effected with the oxygen gas and the steam supplied to the furnace 16 as described above. The resultant gasified coal enters the flow path 17. Since the gasified coal thus produced, unlike that obtained by the use of air, does not entrain nitrogen, the amount of the gasified fuel is about 50% of that obtained by the use of air. As a result, the gasifying furnace 16 operates satisfactorily with a small capacity and the gasified coal possesses a calorific value exceeding 3,000 Kcal/Nm$^3$.

The gasified coal of such a small, volume as mentioned above is advanced via the flow path 17, is passed through the dust removing device 18 and the desulfurizing device 19 and is consequently cleaned up through the removal of dust and desulfurization, then is introduced into the combustion device 20, is burnt with the compressed air delivered from the air compressor 1 via the flow path 21, and is forwarded via the flow path 22 to the gas turbine 23.

In the present embodiment, the nitrogen gas which has passed in a highly compressed state through the oxygen adsorption towers 5a, 5b is mixed with the aforementioned combustion gas and is introduced via the flow paths 12, 22 into the gas turbine 23. Owing to the incorporation of the nitrogen gas, the mixed fluid entering the gas turbine 23 possesses a temperature not exceeding the highest allowable working temperature of the material of the gas turbine 23 and the potential energy of the highly compressed nitrogen gas and the potential energy of the combustion gas are jointly converted into a motive force by the gas turbine 23 and consumed in causing the generator 24 to effect power generation.

The potential energy of gas emanating from the gas turbine 23 is recovered in the form of electric power by the recovery boiler steam turbine system 25 installed on the downstream side of the gas turbine 23.

The preceding embodiment has been depicted as using two parallel oxygen adsorption towers. Optionally, it may be adapted to use three or more parallel oxygen adsorption towers. It is alternatively permissible to use a plurality of mutually independent oxygen adsorption towers and attain continuous production of oxygen by performing the adsorption and desorption of oxygen successively in each of the oxygen adsorption towers.

This invention manifests the following effects.

(1) The adsorption of oxygen can be carried out with high efficiency by bleeding the compressed air emanating from the air compressor of the gas turbine, introducing the compressed gas into the oxygen adsorption tower, and causing the oxygen of the compressed air to be adsorbed therein by the oxygen adsorbent under an increased pressure. Moreover, the oxygen adsorption towers effect adsorption of oxygen in an amount of about 20% by volume, based on the amount of the air. This fact coupled with the aforementioned highly efficient adsorption under a highly increased pressure allows even small-capacity oxygen adsorption towers to operate satisfactorily and small amounts of the oxygen adsorbent to function sufficiently.

(2) Since the gasification of a fuel of inferior quality is effected with the oxygen gas desorbed from the oxygen adsorbent, the amount of the gas to be handled and the amount of the gasified fuel to be produced are small and the gasifying furnace and the devices used for desulfurization and dust removal of the gasified fuel are proportionately small as compared with those involved in the gasification using the air. At the same time, the gasified fuel possesses a high calorific value and manifests high combustibility.

(3) The highly compressed nitrogen gas which has flowed through the oxygen adsorption towers can be introduced into the gas turbine for recovery of its energy. Further, owing to the incorporation of the nitrogen gas, the hot highly compressed mixed fluid entering the gas turbine possesses a temperature not exceeding the highest allowable working temperature of the material of the gas turbine and ensures a safe operation of the gas turbine.

(4) The component steps of the method of this invention including the adsorption and desorption of oxygen in the oxygen adsorption towers can be quickly started, stopped, and controlled. Thus, the method of this invention can cope with load change and frequent starts and stops of power generation.

What is claimed is:

1. A method for power generation with a gas turbine using a gasified fuel of inferior quality, said method comprising: bleeding part of highly compressed air emanating from an air compressor driven by a gas turbine and introducing said part of highly compressed air into an oxygen adsorbing tower containing an oxygen adsorbent of Na-A type zeolite thereby causing the oxygen of said part of highly compressed air to be adsorbed by the oxygen adsorbent and, at the same time, allowing the nitrogen of said part of the highly compressed air to flow in a highly compressed state through the oxygen adsorbing tower; subjecting the adsorbing tower to a vacuum which causes the adsorbed oxygen to be desorbed from the oxygen adsorbent; compressing the oxygen desorbed from the oxygen adsorbent and gasifying a fuel of inferior quality with the compressed oxygen gas as an oxidizing agent; effecting combustion of the gasified fuel of inferior quality with the remainder of said compressed air produced by the air compressor; mixing the gas produced by the combustion of the gasified fuel with said highly compressed nitrogen gas having flowed through the adsorbing tower; and introducing the mixture of said gas and said compressed nitrogen gas into the gas turbine thereby driving the gas turbine and inducing power generation.

2. A method according to claim 1, and further comprising operating the air compressor to compress the air to a pressure of about 15 atmospheres whereby such air is introduced into the oxygen adsorbing tower, and compressing the oxygen desorbed from the adsorbent in the oxygen adsorbing tower to a pressure of about 30 atmospheres whereby such air is used as an oxidizing agent for said gasified fuel of inferior quality.

* * * * *